US010780580B2

(12) United States Patent
Fukunaga et al.

(10) Patent No.: US 10,780,580 B2
(45) Date of Patent: Sep. 22, 2020

(54) TEACHING APPARATUS USED FOR OPERATION OF INDUSTRIAL ROBOT

(71) Applicant: Kobe Steel, Ltd., Kobe-shi (JP)

(72) Inventors: Atsushi Fukunaga, Fujisawa (JP); Daisuke Umekawa, Fujisawa (JP); Kenta Kobayashi, Fujisawa (JP); Ryota Hatakeyama, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 783 days.

(21) Appl. No.: 14/874,699

(22) Filed: Oct. 5, 2015

(65) Prior Publication Data

US 2016/0144513 A1    May 26, 2016

(30) Foreign Application Priority Data

Nov. 21, 2014   (JP) ................................ 2014-237038

(51) Int. Cl.
*B25J 9/16*     (2006.01)
*B25J 13/06*    (2006.01)
(Continued)

(52) U.S. Cl.
CPC ............. *B25J 9/1656* (2013.01); *B25J 13/06* (2013.01); *G05B 19/409* (2013.01);
(Continued)

(58) Field of Classification Search
CPC ....... B25J 9/1656; B25J 13/06; G05B 19/409; G05B 19/425; G05B 2219/36162; G05B 2219/39443; Y10S 901/05
See application file for complete search history.

(56) References Cited

U.S. PATENT DOCUMENTS

| 5,115,179 | A | * | 5/1992 | Fujii | ........................ | B25J 13/06 |
| | | | | | | 200/5 R |
| 5,665,945 | A | * | 9/1997 | Oshima | .................... | B25J 13/02 |
| | | | | | | 200/1 R |

(Continued)

FOREIGN PATENT DOCUMENTS

| EP | 1 405 700 A2 | 4/2004 |
| EP | 1 406 139 A2 | 4/2004 |

(Continued)

OTHER PUBLICATIONS

Extended European Search Report dated May 6, 2016 in European Patent Application No. 15003042.7.

*Primary Examiner* — Stephen Holwerda
(74) *Attorney, Agent, or Firm* — Oblon, McClelland, Maier & Neustadt, L.L.P.

(57) ABSTRACT

A teaching apparatus that is connected to a control apparatus controlling a welding robot and outputs a command intended for the welding robot to the control apparatus is provided. The teaching apparatus includes a welding-parameter-manipulating portion provided on a front face and accepting an operation of changing a setting that defines a movement, of the welding robot, an enabling switch provided on a back face and accepting an operation of changing a state of electrification of the welding robot, and a robot-manipulating portion provided on the back face and accepting an operation of executing the movement of the welding robot. The welding-parameter-manipulating portion is positioned on a left side, in front view, with respect to the center, and the enabling switch and the robot-manipulating portion are positioned on a right side, in rear view, with respect to the center.

9 Claims, 10 Drawing Sheets (51) Int. Cl.
  *G05B 19/409* (2006.01)
  *G05B 19/425* (2006.01)

(52) U.S. Cl.
  CPC .. *G05B 19/425* (2013.01); *G05B 2219/36162* (2013.01); *G05B 2219/39443* (2013.01); *Y10S 901/05* (2013.01)

(56) References Cited

U.S. PATENT DOCUMENTS

| | | | | |
|---|---|---|---|---|
| 5,874,906 | A | * | 2/1999 | Willner ................ G06F 3/0219 341/20 |
| 6,134,102 | A | * | 10/2000 | Worn ................... B25J 9/1656 361/679.09 |
| 2004/0068335 | A1 | * | 4/2004 | Ferla ................... G05B 19/425 700/86 |
| 2004/0248619 | A1 | * | 12/2004 | Graiger ................ G05B 19/409 455/566 |
| 2005/0060064 | A1 | * | 3/2005 | Valen ..................... B25J 13/02 700/264 |
| 2010/0106299 | A1 | * | 4/2010 | Nagata ................... B25J 19/06 700/264 |
| 2011/0234369 | A1 | * | 9/2011 | Cai ....................... G06F 3/0346 340/4.31 |

FOREIGN PATENT DOCUMENTS

| | | |
|---|---|---|
| EP | 1 405 700 B1 | 7/2009 |
| FR | 2 852 442 A1 | 9/2004 |
| JP | 08-045392 | 2/1996 |
| JP | 2003-84864 | 3/2003 |
| JP | 2004-122243 | 4/2004 |
| JP | 2004-122356 A | 4/2004 |
| JP | 2012-110995 A | 6/2012 |
| TW | 394891 | 6/2000 |

\* cited by examiner

| | | MAIN | PENDING | DISPLAY |
|---|---|---|---|---|
| HOME | INPUT INCREMENT/DECREMENT | | | |
| EXECUTE COMMAND | WELDING CURRENT (01–10) | 5 | | [A] |
| INCREMENT/ DECREMENT | ARC VOLTAGE (1–5) | 1 | | [%] |
| | WELDING SPEED (00.1–10.0) | 1.0 | | [cm/min] |
| | WEAVING AMPLITUDE (01–50) | 10 | | [0.1 mm] |
| | WEAVING FREQUENCY (01–00) | 1 | | [TIMES/min] |
| | WEAVING STOP TIME (1–5) | 1 | | [0.1 sec] |
| F1: | F2: | F3: | F4: RETURN | F5: END MODE |

TEACHING APPARATUS USED FOR OPERATION OF INDUSTRIAL ROBOT

BACKGROUND OF THE INVENTION

1. Field of the Invention

The present invention relates to a teaching apparatus used for operation of an industrial robot.

2. Description of the Related Art

In general, when an industrial robot intended for welding is used, an operation for checking welding parameters is performed by moving the robot prior to actual welding operation. Such a checking operation is performed for optimizing the shape and the penetration of the bead by changing welding parameters, such as welding current, arc voltage, and welding speed, through a teaching apparatus. In the checking operation, the operator needs to check the state of the welded part during the welding operation and therefore performs the checking operation near the arm tip of the robot where arc is generated. Hence, in terms of safety, the checking operation is performed in a manual mode in which the robot is moved manually.

International Organization of Standardization (ISO) provides requirements for performing the checking operation in the manual mode, one of which is specified in ISO 10218-1 5.7.4 as follows: "(the robot shall) provide a pendant conforming to 5.8 with a hold-to-run function in addition to the enabling device that permits robot motion to continue." The hold-to-run function is a function that permits the robot to move only when the function is operated manually with a hand of an operator, and stops the robot when the hand is released from the function. Hence, in the operation for checking the welding parameters, the operator changes any of the welding parameters while pressing both a switch (an enabling switch) of an enabling device that starts electrification of the robot and a button that permits the robot to move.

An exemplary known teaching apparatus includes an enabling switch provided on the back face thereof and other operation buttons provided on the front face thereof. There are some known technologies that are each based on a consideration for ease of operation of such a teaching apparatus having an enabling switch on the back face thereof. For example, according to Japanese Unexamined Patent Application Publication No. 2004-122243, a one-handed teaching apparatus includes, on the front face thereof, a manipulation-key switch that controls the state of movement of a teaching-object apparatus during an operation of teaching the teaching-object apparatus; and, on the back face thereof, an enabling switch that activates the teaching-object apparatus when a pressing force is applied thereto by an operator gripping the teaching apparatus. The enabling switch of the teaching apparatus includes an enabling-switch operating portion provided on an enabling-switch holding portion. The enabling-switch operating portion extends obliquely from a position near a sidewall of the teaching apparatus. For another example, according to Japanese Unexamined Patent Application Publication No. 2003-84864, a portable manipulation apparatus includes a casing and a plurality of manipulation switches provided on a front surface of the casing. The casing has, at a predetermined position, a plate-like thumb-supporting portion that catches the thumb of the left hand of the operator.

To move a robot manually by operating a teaching apparatus during an operation for checking welding parameters, the operator needs to press an enabling switch and a robot-activating button simultaneously. To change a welding parameter during the checking operation, an operation for changing the welding parameters needs to be performed additionally. That is, the operator needs to press a plurality of buttons during the operation of the teaching apparatus and therefore has to use both hands, not one hand. Moreover, to protect the face and other body parts from the arc, the operator occasionally holds a welding protection mask (face shield). In that case, the operator operates the teaching apparatus with the hand holding the welding protection mask. Such a situation is unfavorable in terms of safety.

The present invention provides a teaching apparatus exhibiting improved ease of operation that allows the operator to easily change settings regarding the movement of a robot.

SUMMARY OF THE INVENTION

According to an aspect of the present invention, there is provided a teaching apparatus that is connected to a control apparatus controlling a robot and outputs a command intended for the robot to the control apparatus. The teaching apparatus includes a setting-manipulating portion provided on a first face of the teaching apparatus and accepting an operation of changing a setting that defines a movement of the robot; an enabling switch provided on a second face of the teaching apparatus that is opposite the first face, the enabling switch accepting an operation of changing a state of electrification of the robot; and a robot-movement-manipulating portion provided on the second face and accepting an operation of executing the movement of the robot. Seen from a side of the first face, the setting-manipulating portion provided on the first face is positioned on a left side or a right side with respect to a center of the teaching apparatus, and the enabling switch and the robot-movement-manipulating portion provided on the second face are positioned on a same side as the setting-manipulating portion.

In the teaching apparatus, it is preferable that a side face extending between the first face and the second face have a width that allows an operator to hold the teaching apparatus with one hand, the enabling switch be positioned in such a manner as to be operable with the one hand that is holding the teaching apparatus, the setting-manipulating portion be positioned within a reach of a thumb of the one hand in a state where the enabling switch is operated with at least any one of second, third, and fourth fingers of the one hand, and the robot-movement-manipulating portion be positioned within a reach of the first finger of the one hand in the state where the enabling switch is operated with at least any one of the second, third, and fourth fingers of the one hand.

Furthermore, the teaching apparatus may include a display provided on the first face, and it is preferable that the setting-manipulating portion include a first button that accepts an operation of displaying, on the display, a screen for changing any of parameters defining a welding operation performed by the robot; a second button that accepts an operation of selecting one of the parameters displayed on the screen; and a third button that accepts an operation of changing a value of the selected parameter.

Furthermore, in the teaching apparatus, it is preferable that the enabling switch and the robot-movement-manipulating portion be each provided at a position excluding a surface of the teaching apparatus that comes into contact with a flat surface if the teaching apparatus is placed on the flat surface with the second face facing the flat surface.

Furthermore, the teaching apparatus may include a plate-like supporting portion provided between the enabling switch and the robot-movement-manipulating portion, the supporting portion supporting a first finger of one of operator's hands that is holding the teaching apparatus.

Furthermore, in the teaching apparatus, it is preferable that the robot-movement-manipulating portion be positioned on a surface sloping at an angle of 5 degrees to 30 degrees with respect to a horizontal direction in a state where the teaching apparatus is placed on a flat surface with the second face facing the flat surface.

Furthermore, in the teaching apparatus, it is preferable that the teaching apparatus have a weight of 1.2 kg or less and a thickness of 5 cm or smaller, the thickness corresponding to a width of a side face extending between the first face and the second face.

Furthermore, in the teaching apparatus, it is preferable that an interval between the enabling switch and the robot-movement-manipulating portion be 5 cm or smaller.

According to another aspect of the present invention, there is provided a teaching apparatus that is connected to a control apparatus controlling a robot and outputs a command intended for the robot to the control apparatus. The teaching apparatus includes a setting-manipulating portion that accepts an operation of changing a setting that defines a movement of the robot, an enabling switch that accepts an operation of changing a state of electrification of the robot, and a robot-movement-manipulating portion that accepts an operation of executing the movement of the robot. The enabling switch is positioned on one of two lateral sides with respect to a center of the teaching apparatus and in such a manner as to be operable with one of operator's hands that is holding the teaching apparatus. In a state where the teaching apparatus is held and the enabling switch is operated with the one hand, the setting-manipulating portion and the robot-movement-manipulating portion are each positioned within a reach of at least any one of a thumb and fingers of the one hand.

According to each of the above aspects of the present invention, a teaching apparatus exhibiting improved ease of operation that allows the operator to easily change settings regarding the movement of a robot is provided.

DESCRIPTION OF THE PREFERRED EMBODIMENTS

An embodiment of the present invention will now be described in detail with reference to the accompanying drawings.

System Configuration

Figure 1:
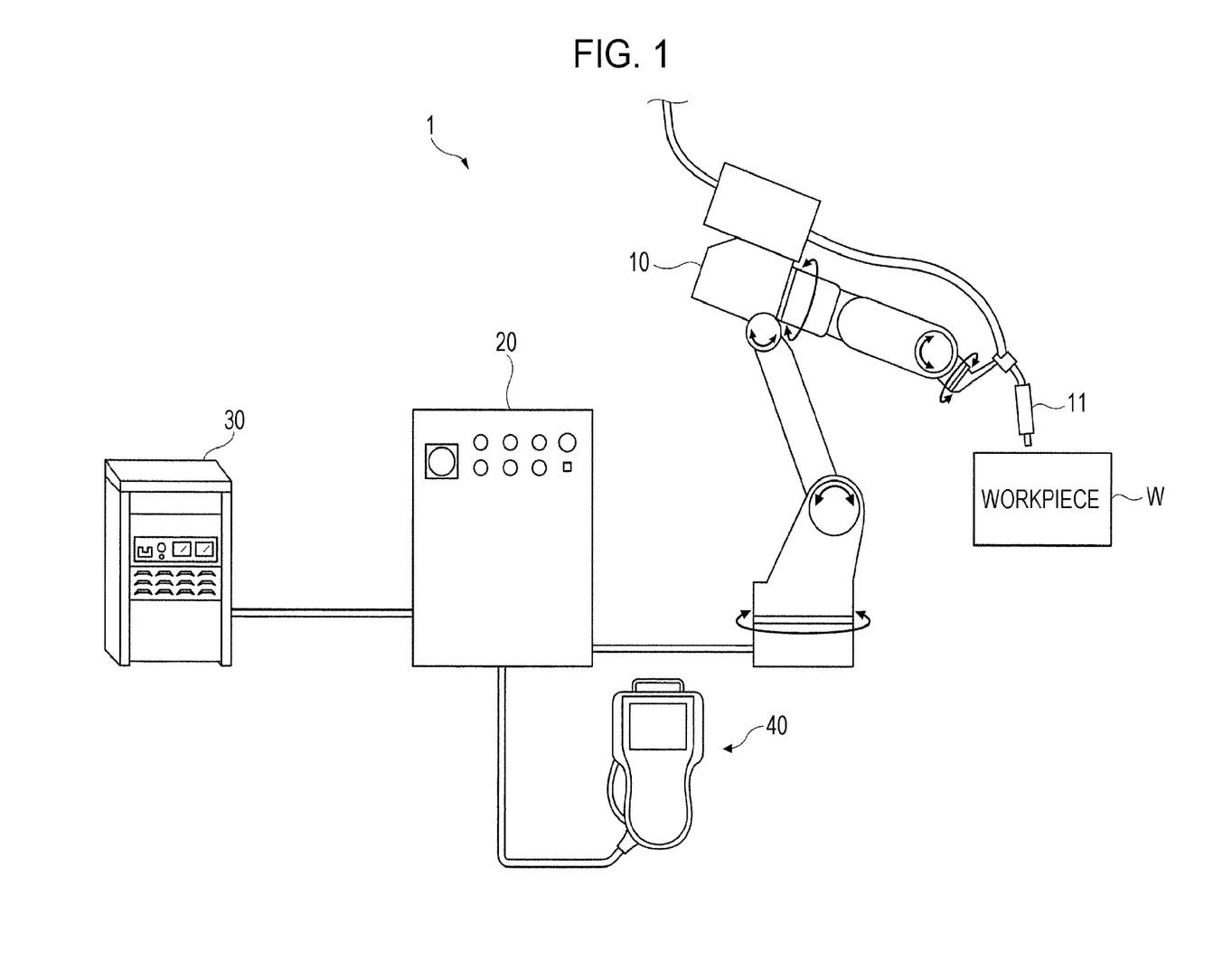
FIG. 1 illustrates an exemplary outline configuration of a welding robot system according to an embodiment of the present invention.

A welding robot system 1 according to the embodiment will first be described. FIG. 1 illustrates an exemplary outline configuration of the welding robot system 1 according to the embodiment.

As illustrated in FIG. 1, the welding robot system 1 includes a welding robot (manipulator) 10 that performs welding on a welding object (workpiece) by using an electrode, and a control apparatus (controller) 20 that controls the welding robot 10. The welding robot system 1 further includes a welding power source 30 that supplies, for a welding operation, power to the welding robot 10 and to the electrode held by a welding torch 11, and a teaching apparatus (teaching pendant) 40 that is used for purposes such as the creation of a teaching program that defines a movement of the welding robot 10, and the determination of settings of the welding operation. The control apparatus 20 is connected to the welding robot 10, the welding power source 30, and the teaching apparatus 40 over a network. The communication between the control apparatus 20 and the teaching apparatus 40 over the network may be either wired or wireless.

The welding robot 10 includes an arm having a plurality of articulations and performs various operations relating to welding in accordance with teaching programs. The arm of the welding robot 10 is provided at the tip thereof with the welding torch 11 with which welding is performed on a workpiece W.

The control apparatus 20 reads a pre-taught teaching program and controls the movement of the welding robot 10. The teaching program is created by, for example, the teaching apparatus 40 or a separately prepared teaching-program-creating apparatus (not illustrated). The control apparatus 20 receives the teaching program over data communication. The teaching program may be provided to the control apparatus 20 in the form of a removable storage medium such as a memory card.

Under the control of the control apparatus 20, the welding power source 30 supplies power to the electrode held by the welding torch 11. With the power supplied from the welding power source 30, the electrode on the welding torch 11 included in the welding robot 10 generates an arc.

The teaching apparatus 40 has various buttons with which an operator creates a teaching program by inputting information such as welding parameters and welding paths, or makes various settings regarding the welding operation. On the basis of such manipulation performed by the operator, the teaching apparatus 40 outputs commands for moving the welding robot 10 to the control apparatus 20. Before the actual welding operation is executed in accordance with the teaching program by using the welding robot 10, a checking operation is performed in which the movement of the welding robot 10 that is to be made in the welding operation is checked in advance. In the checking operation, the welding robot 10 moves in accordance with the pre-taught teaching program, and the operator checks whether or not the welding robot 10 moves by following teaching points that are preset for the welding operation, whether or not the welding operation is properly performed by the welding torch 11, and so forth. Then, if necessary, the operator corrects the teaching program by changing associated welding parameters so that the welding robot 10 performs the welding operation properly.

The welding parameters that are to be changed include, for example, welding current, arc voltage, welding speed, weaving amplitude, weaving frequency, weaving stop time, the amount of shift in the weld line, and so forth. Welding current refers to a current flowing between the electrode and the workpiece W during the welding operation. Arc voltage refers to a voltage applied between the electrode and the workpiece W during the welding operation. Welding speed refers to a speed at which the welding robot 10 moves. Weaving amplitude refers to an amplitude at which the welding torch 11 weaves. Weaving frequency refers to the frequency of weaving per unit time. Weaving stop time refers to a time period for which the electrode stops on each of two sides between which the electrode weaves. The amount of shift in the weld line relates to multi-pass welding and refers to the amount by which the teaching point is shifted in the welding area.

Configuration of Teaching Apparatus

Figure 2:
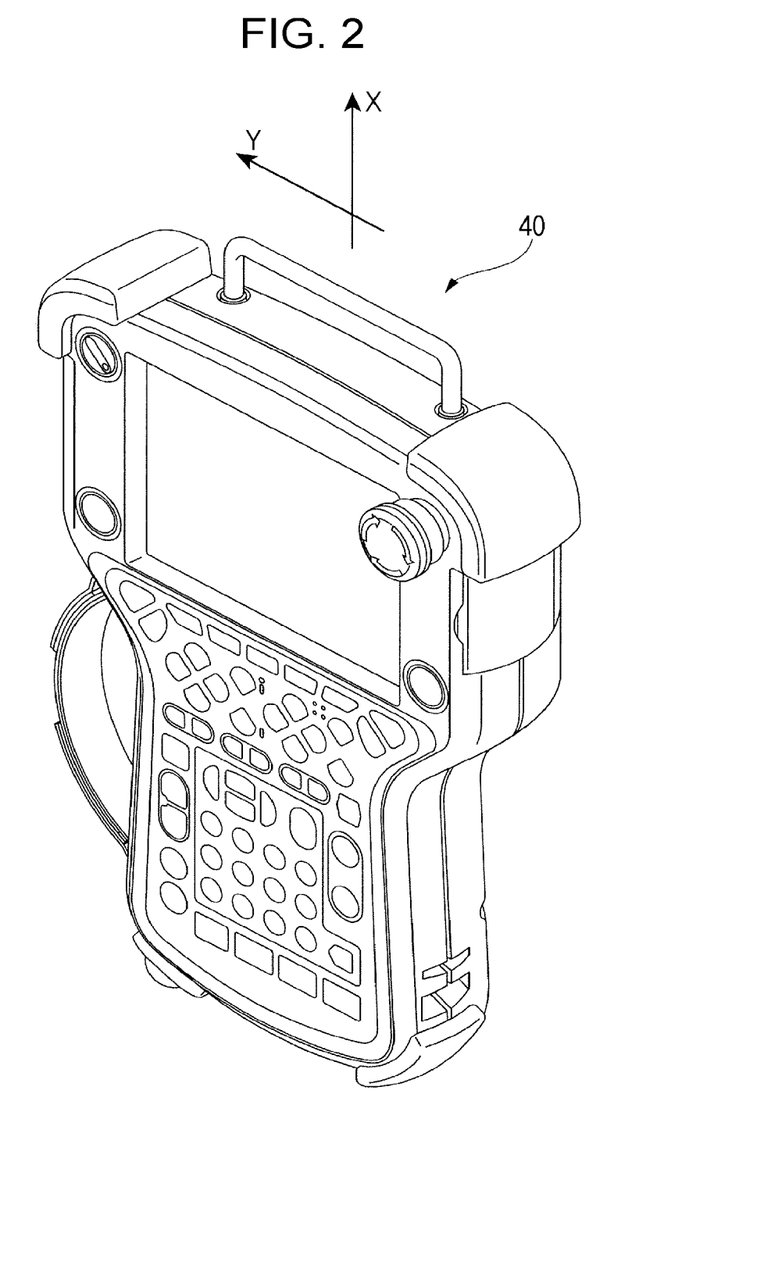
FIG. 2 is a perspective view of a teaching apparatus and illustrates an exemplary front appearance thereof.
Figure 3:
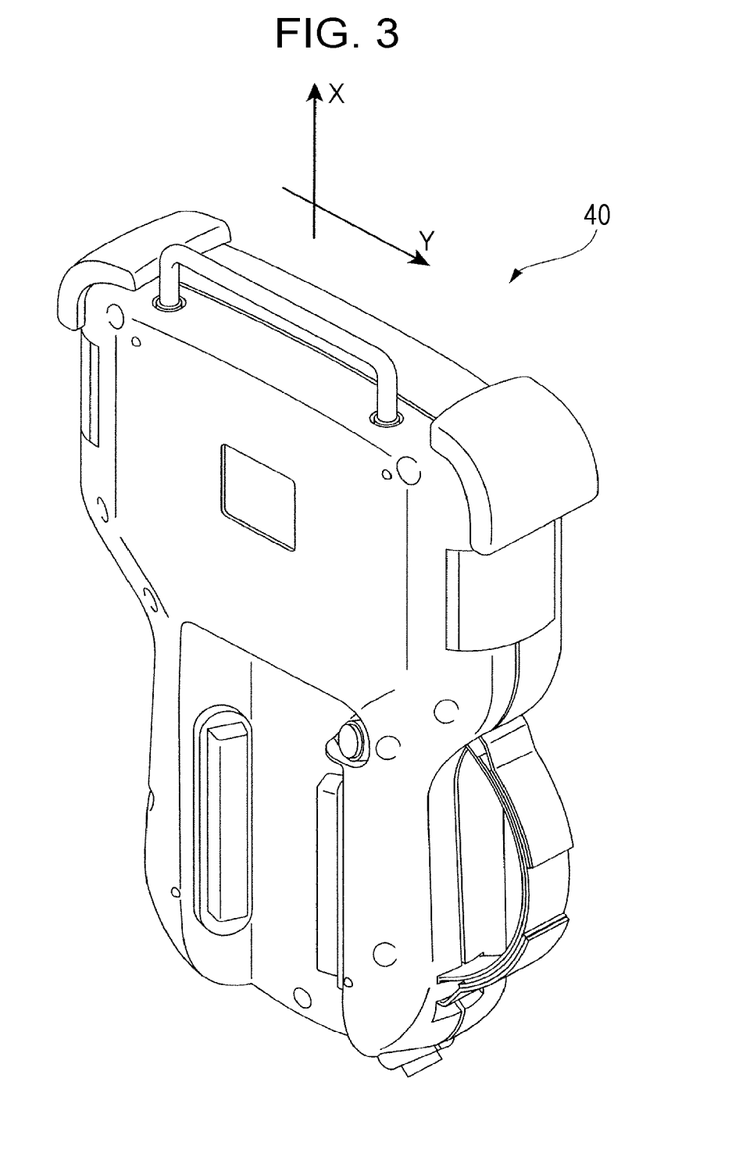
FIG. 3 is a perspective view of the teaching apparatus and illustrates an exemplary rear appearance thereof.
Figure 4:
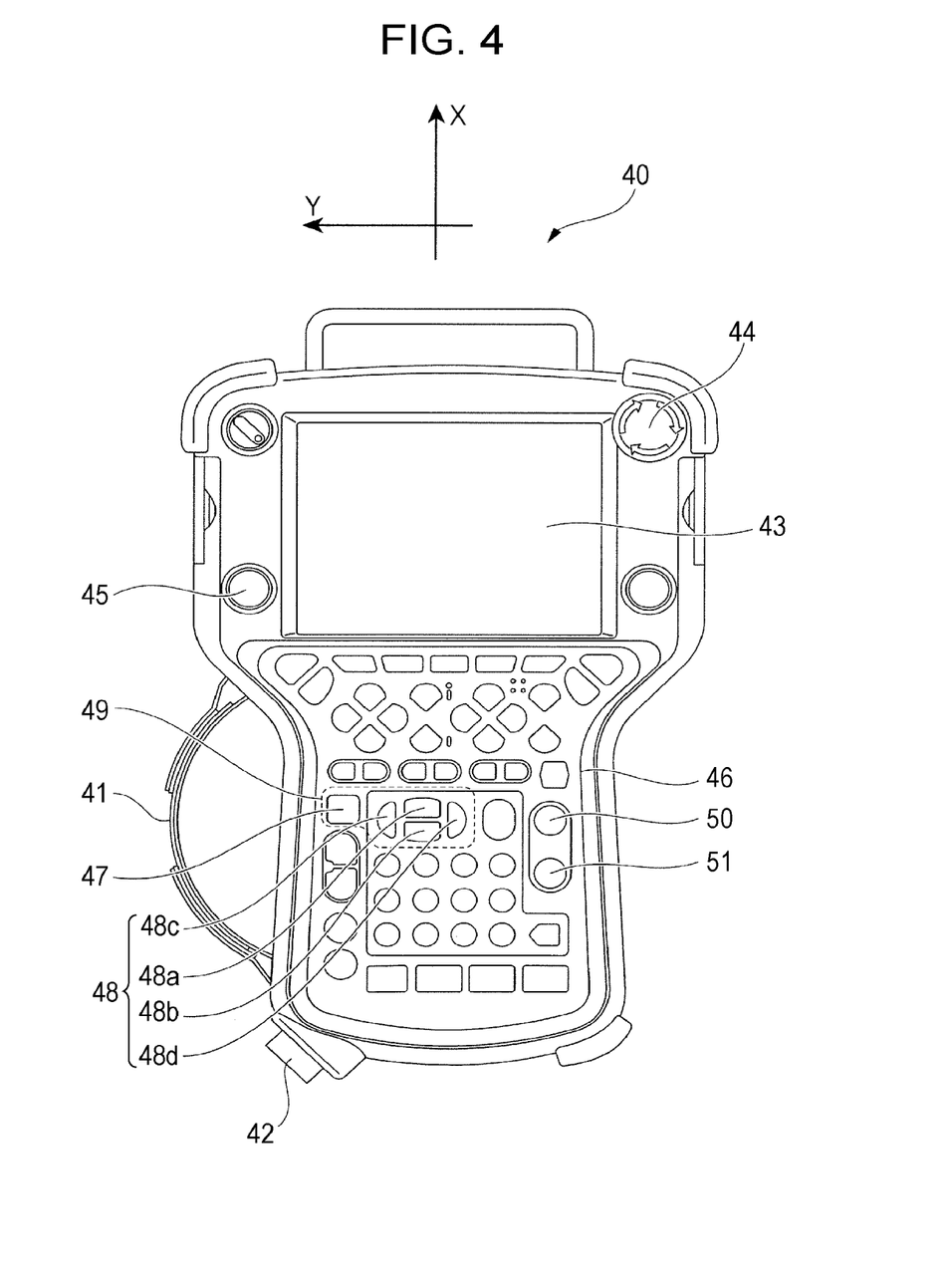
FIG. 4 illustrates the exemplary front appearance of the teaching apparatus.
Figure 5:
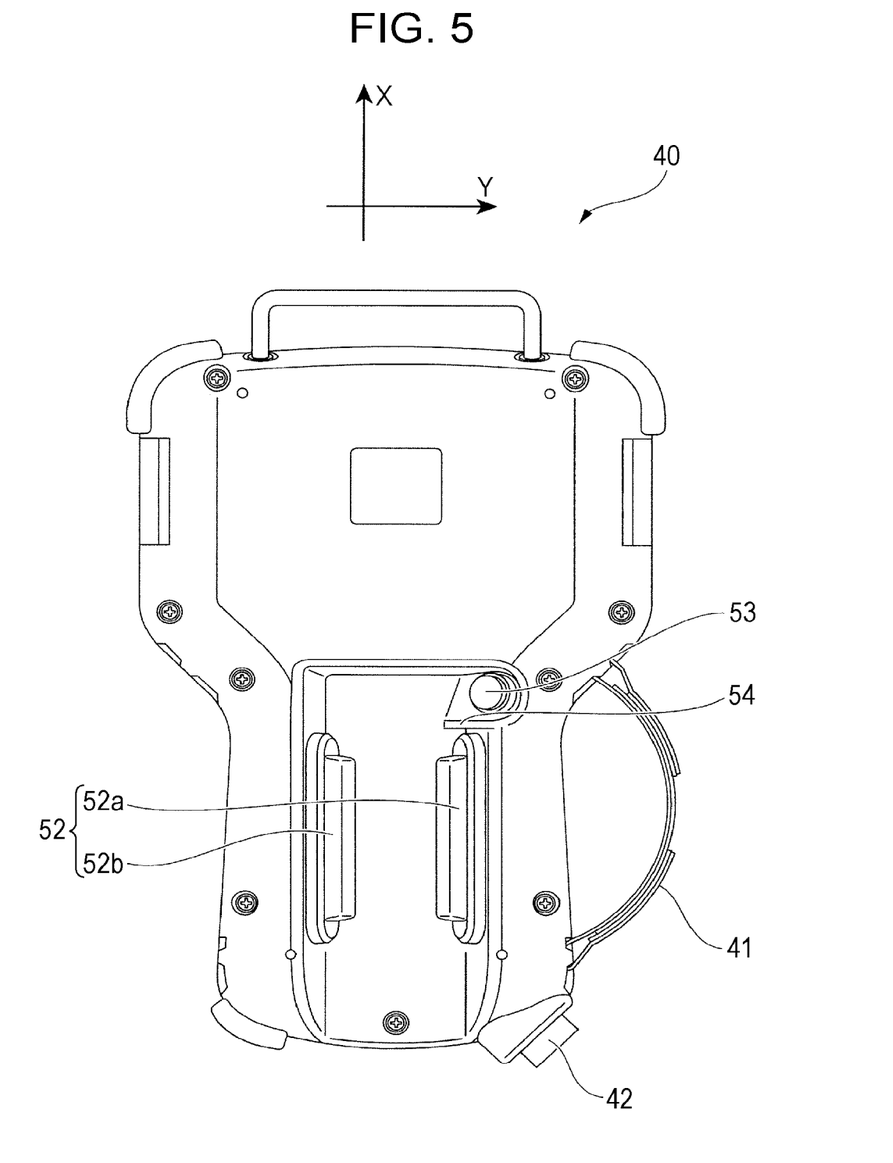
FIG. 5 illustrates the exemplary rear appearance of the teaching apparatus.

A configuration of the teaching apparatus 40 will now be described in detail. FIG. 2 is a perspective view of the teaching apparatus 40 and illustrates an exemplary front appearance thereof. FIG. 3 is a perspective view of the teaching apparatus 40 and illustrates an exemplary rear appearance thereof. FIG. 4 illustrates the exemplary front appearance of the teaching apparatus 40. FIG. 5 illustrates the exemplary rear appearance of the teaching apparatus 40. The vertical direction represented by the X axis in FIGS. 2 to 5 corresponds to the longitudinal direction, i.e., the vertical direction, of the teaching apparatus 40. The lateral direction represented by the Y axis in FIGS. 2 to 5 corresponds to the width direction, i.e., the lateral direction, of the teaching apparatus 40. In the embodiment, the front face of the teaching apparatus 40 corresponds to an exemplary first face, and the back face of the teaching apparatus 40 corresponds to an exemplary second face.

As illustrated in FIGS. 2 to 5, the teaching apparatus 40 has a T shape and includes a casing having a certain thickness in the depth direction of FIGS. 4 and 5. A strap 41 that helps the operator hold the teaching apparatus 40 is provided on a portion of the side face extending between the front face and the back face of the teaching apparatus 40. The width of the side face, i.e., the thickness of the teaching apparatus 40, is set such that the operator can hold the teaching apparatus 40. The operator holds the teaching apparatus 40 with the left hand placed under the strap 41. The center of gravity of the teaching apparatus 40 is set at the center of the teaching apparatus 40 or at a position on the left side, in FIG. 4, with respect to the center of the teaching apparatus 40. Thus, the operator holding the teaching apparatus 40 with the left hand can stably operate the teaching apparatus 40. A connector 42 is provided on a lower left portion, in front view, of the side face of the teaching apparatus 40. A cable for connection to the control apparatus 20 is to be inserted into the connector 42. When the cable is inserted into the connector 42, the teaching apparatus 40 is connected to the control apparatus 20. When the cable is disconnected from the connector 42, the teaching apparatus 40 alone can be carried around.

Configuration on Front Face of Teaching Apparatus

As illustrated in FIGS. 2 and 4, a display 43 is provided on the front face of the teaching apparatus 40 in a portion of the T shape that has the larger width. Information on the movement of the welding robot 10, information on a teaching operation, and so forth are displayed on the display 43. The display 43 may be a touch-panel display. An emergency stop button 44 is provided on the upper right of the front face of the teaching apparatus 40. The emergency stop button 44 is provided for stopping the welding robot 10 in case of emergency. When the emergency stop button 44 is pressed by the operator, a command for emergency stop of the welding robot 10 is issued. In response to the command, the control apparatus 20 stops the driving of a motor of the welding robot 10, and the movement of the welding robot 10 is stopped. Referring to FIG. 4, a stop key 45 is provided on the left side of the display 43. The stop key 45 is provided for pausing the welding robot 10. When the stop key 45 is pressed by the operator, the control apparatus 20 decelerates the movement of the welding robot 10 while keeping the motor driving the welding robot 10, and eventually stops the welding robot 10.

The teaching apparatus 40 includes a button-providing area 46 in a portion of the T shape thereof that has the smaller width, i.e., a portion below the display 43 in front view as illustrated in FIG. 4. Buttons for performing operations, such as the setting of the movement of the welding robot 10, are provided in the button-providing area 46. The buttons provided in the button-providing area 46 may be of any type but are each preferably a sheet-type button so that the operator can operate the button quickly, with the depth to which the button is depressed being small. Nevertheless, to prevent the occurrence of operational errors, the buttons each preferably provide a tactile pressing sensation when pressed with a certain level of force.

The buttons provided in the button-providing area 46 include, for example, a screen change key 47, a change key 48a, a change key 48b, a change key 48c, a change key 48d (hereinafter collectively denoted as change keys 48 if there is no need to distinguish them from one another), an advance key 50, and a reverse key 51.

The screen change key 47 is provided for changing the screen that appears on the display 43 and is used for displaying, for example, a screen for changing welding parameters on the display 43.

The change keys 48 are provided for changing welding parameters in the checking operation.

In the checking operation, when the operator has confirmed that the welding robot 10 has started a welding operation and an arc has been generated, the operator presses the screen change key 47, whereby the screen for changing welding parameters is displayed on the display 43. If the operator observing the movement of the welding robot 10 has determined that any of the welding parameters needs to be changed, the operator presses any of the change keys 48 and changes that welding parameter.

The change keys 48 are arranged in a crisscross pattern and include four buttons representing four directions, respectively. The change key 48a represents the upward direction. The change key 48b represents the downward direction. The change key 48c represents the leftward direction. The change key 48d represents the rightward direction. To change a welding parameter, for example, the operator presses the change key 48a representing the upward direction or the change key 48b representing the downward direction, thereby selecting an item whose value is desired to be changed among a plurality of items corresponding to the respective welding parameters. Subsequently, the operator presses the change key 48c representing the leftward direction or the change key 48d representing the rightward direction so as to increase or decrease the value of the selected item. Thus, the operator changes the value of a welding parameter.

Hereinafter, the screen change key 47 and the change keys 48 are collectively referred to as a welding-parameter-manipulating portion 49. The welding-parameter-manipulating portion 49 is used for changing settings, such as welding parameters, regarding the movement of the welding robot 10. The welding-parameter-manipulating portion 49 is provided in a portion on the left side, in front view, with respect to the center of the teaching apparatus 40. The welding-parameter-manipulating portion 49 is positioned within the reach of the thumb of the operator's left hand placed under the strap 41 of the teaching apparatus 40, and within an area where the operator can move the thumb freely with no discomfort. The welding-parameter-manipulating portion 49 according to the embodiment is an exemplary setting-manipulating portion. Furthermore, the screen change key 47 is an exemplary first button, the change key 48a and the change key 48b are exemplary second buttons, and the change key 48c and the change key 48d are exemplary third buttons.

The advance key 50 advances the teaching program and executes the movement of the welding robot 10 in accordance with the teaching program.

The reverse key 51 reverses the teaching program and causes the welding robot 10 to move in the reverse way.

Configuration on Back Face of Teaching Apparatus

Referring to FIGS. 3 and 5, the teaching apparatus 40 has a recess in the back face, opposite the front face, thereof in a portion of the T shape that has the smaller width. An enabling switch 52a, an enabling switch 52b (hereinafter collectively denoted as enabling switches 52 if there is no need to distinguish them from each other), a robot-manipulating portion 53, and a supporting portion 54 are provided in the recess.

The enabling switches 52 are provided for changing the state of electrification of the welding robot 10. To manually move the welding robot 10 in the checking operation, the operator needs to keep pressing the enabling switch 52a or the enabling switch 52b so that the welding robot 10 is kept electrified. The enabling switches 52 are each positioned on one of two lateral sides with respect to the center of the teaching apparatus 40. The enabling switch 52a is on the right side, in rear view, with respect to the center of the teaching apparatus 40, that is, on the same side as the welding-parameter-manipulating portion 49 provided on the front face of the teaching apparatus 40. The enabling switch 52b is provided on the left side, in rear view, with respect to the center of the teaching apparatus 40. That is, the enabling switch 52a is positioned in such a manner as to be operable with the operator's left hand holding the teaching apparatus 40.

The shape of each of the enabling switches 52 is not specifically limited but is preferably a rectangular parallelepiped shape with a surface on which the operator's fingers are to be placed being flat so that the operator can easily press the enabling switch 52 with a plurality of fingers. The enabling switches 52 are each provided on a sloping surface that slopes with respect to the Y-axis direction. More specifically, in a state where the teaching apparatus 40 is placed face up on a flat surface, the enabling switches 52 are each not provided on a surface that comes into contact with the flat surface but are each provided on a surface sloping with respect to the surface of contact extending in the horizontal direction (the Y-axis direction).

Providing each of the enabling switches 52 on a sloping surface makes it easier for the operator who is holding the teaching apparatus 40 with the left hand to keep pressing the enabling switch 52a than in a configuration in which, for example, the enabling switch 52a is provided on a flat surface extending in the Y-axis direction. In the configuration in which the enabling switches 52 are each provided on a flat surface extending in the Y-axis direction, if the operator places the teaching apparatus 40 face up on a flat surface, the enabling switches 52 may be pressed accidentally. Hence, the enabling switches 52 are each provided on a sloping surface. Thus, an operational error that may occur when the teaching apparatus 40 is placed somewhere is prevented.

Each of the enabling switches 52 can be depressed to a plurality of depths. When the enabling switch 52 is depressed to a first depth, the welding robot 10 is electrified as described above. When the enabling switch 52 is depressed further to a second depth by the operator, a command for pausing the welding robot 10 is issued.

The robot-manipulating portion 53 is provided for advancing the teaching program and thus executing the movement of the welding robot 10 in accordance with the teaching program. That is, the robot-manipulating portion 53 has the same function as the advance key 50. To manually move the welding robot 10 in the checking operation, the operator needs to keep pressing both the enabling switch 52 and a button for advancing the teaching program (i.e., the advance key 50 or the robot-manipulating portion 53). If the operator is holding the teaching apparatus 40 with the left hand, the operator has to use the right hand to press the advance key 50 but can use the left hand to press the robot-manipulating portion 53. Hence, the operator moves the welding robot 10 by pressing both the enabling switch 52a and the robot-manipulating portion 53 with the left hand.

The robot-manipulating portion 53 is provided above the enabling switch 52a and on the right side, in rear view, with respect to the center of the teaching apparatus 40, that is, on the same side as the welding-parameter-manipulating portion 49 provided on the front face of the teaching apparatus 40. The robot-manipulating portion 53 is positioned within the reach of the left first finger of the operator who is holding the teaching apparatus 40 with the left, hand placed under the strap 41 and is pressing the enabling switch 52a with at least any one of the left second, third, and fourth fingers. Likewise, the welding-parameter-manipulating portion 49 is positioned within the reach of the left thumb of the operator who is holding the teaching apparatus 40 with the left hand placed under the strap 41 and is pressing the enabling switch 52a with at least any one of the left second, third, and fourth fingers. That is, the operator holding the teaching apparatus 40 with the left hand can press the welding-parameter-manipulating portion 49 with the left thumb while pressing the robot-manipulating portion 53 with the left first finger and the enabling switch 52a with at least any one of the left second, third, and fourth fingers.

The robot-manipulating portion 53 is provided on a sloping surface that slopes with respect to the Y-axis direction, as with the enabling switches 52. More specifically, in the state where the teaching apparatus 40 is placed face up on a flat surface, the robot-manipulating portion 53 is not provided on a surface that comes into contact with the flat surface but is provided on a surface sloping with respect to the surface of contact extending in the horizontal direction. Providing the robot-manipulating portion 53 on a sloping surface makes it easier for the operator who is holding the teaching apparatus 40 with the left hand to keep pressing the robot-manipulating portion 53 than in a configuration in which, for example, the robot-manipulating portion 53 is provided on a flat surface extending in the Y-axis direction. Furthermore, as with the case of the enabling switch 52, providing the robot-manipulating portion 53 on a sloping surface prevents an operational error that may occur when the teaching apparatus 40 is placed somewhere.

The robot-manipulating portion 53 is preferably provided on a surface sloping at an angle from 5 degrees to 30 degrees with respect to the Y axis. If the angle of slope of the surface falls below 5 degrees, the difference between the angle of bend in the first finger pressing the robot-manipulating portion 53 and the angle of bend in the finger (any of the second, third, and fourth fingers) pressing the enabling switch 52a becomes large. If the operator keeps pressing the robot-manipulating portion 53 for a long time in such a state, the fatigue that the first finger suffers increases. On the other hand, if the angle of slope of the surface exceeds 30 degrees, the angle of bend in the first finger becomes too large. If the operator keeps pressing the robot-manipulating portion 53 for a long time in such a state, the fatigue that the first finger suffers increases. Moreover, according to an experiment, it has been found that the preferable angle of slope of the robot-manipulating portion 53 with respect to the Y axis is 15 degrees.

Designing the robot-manipulating portion 53 so as to be depressible deeply by the operator or employing, as the robot-manipulating portion 53, a button that is turned on by being depressed only shallowly reduces the burden imposed on the first finger of the operator and makes it easier for the operator to keep pressing the robot-manipulating portion 53. In the embodiment, the robot-manipulating portion 53 is employed as an exemplary robot-movement-manipulating portion.

The supporting portion 54 has a plate-like shape and is provided between the robot-manipulating portion 53 and the enabling switch 52a. The operator presses the robot-manipulating portion 53 with the first finger being supported by the supporting portion 54. More specifically, since the robot-manipulating portion 53 is provided in the recess of the teaching apparatus 40, the robot-manipulating portion 53 is surrounded by walls of the recess on the upper side and the right side and the supporting portion 54, whereby a space for receiving the first finger is provided at the robot-manipulating portion 53. Hence, the operator can place the first finger on the supporting portion 54. Thus, the operator can press the robot-manipulating portion 53 more easily and the fatigue that the first finger suffers becomes smaller than in a case where, for example, the supporting portion 54 is not provided. Furthermore, providing the supporting portion 54 allows the operator to easily find the position of the robot-manipulating portion 53 without checking it visually but only by feeling around with the first finger. In addition, the supporting portion 54 can be used as a rest for the first finger when there is no need for the operator holding the teaching apparatus 40 to press the robot-manipulating portion 53.

Description of How Operator Holds Teaching Apparatus

Figure 6:
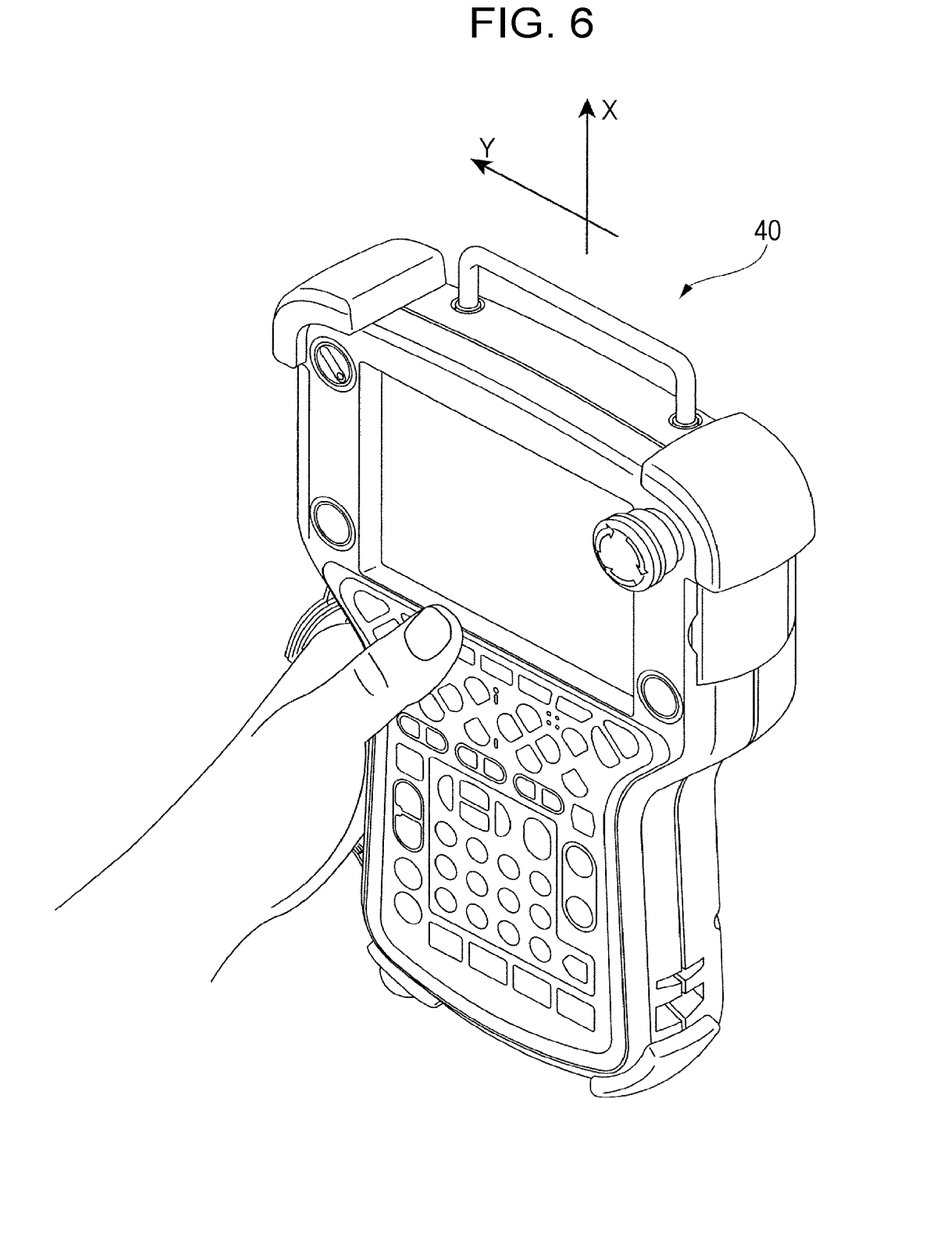
FIG. 6 illustrates an exemplary front appearance of the teaching apparatus that is held by a hand of an operator.
Figure 7:
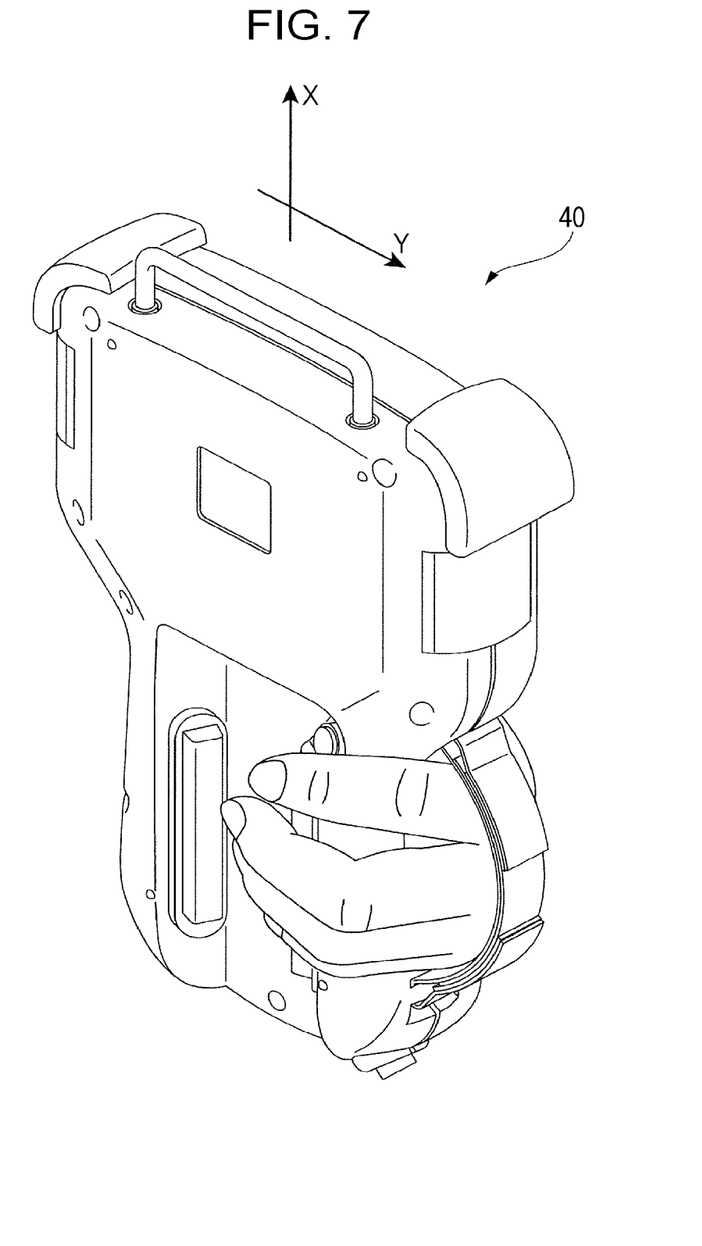
FIG. 7 illustrates an exemplary rear appearance of the teaching apparatus that is held by the hand of the operator.

How the operator holds the teaching apparatus 40 will now be described. FIG. 6 illustrates an exemplary front appearance of the teaching apparatus 40 that is held by a hand of the operator. FIG. 7 illustrates an exemplary rear appearance of the teaching apparatus 40 that is held by the hand of the operator.

As illustrated in FIGS. 6 and 7, during the checking operation, the operator holds the teaching apparatus 40 with the left hand placed under the strap 41 and presses the enabling switch 52 and the robot-manipulating portion 53 that are provided on the back face of the teaching apparatus 40. When the operator presses the enabling switch 52 and the robot-manipulating portion 53, a pre-taught teaching program is executed by the control apparatus 20, whereby the welding robot 10 starts to move. To change any welding parameters while the operator is checking the movement of the welding robot 10, the operator presses the welding-parameter-manipulating portion 49 provided on the front face of the teaching apparatus 40 while pressing the enabling switch 52 and the robot-manipulating portion 53.

The operator occasionally holds a welding protection mask with one hand so as to protect the face and other body parts from the arc generated during the checking operation. Therefore, the buttons of the teaching apparatus 40 according to the embodiment are arranged such that the operator can easily operate the buttons with one hand. Specifically, the operator holds the teaching apparatus 40 with the left hand, presses the enabling switch 52a with at least any one of the left second, third, and fourth fingers, and presses the robot-manipulating portion 53 with the left first finger, thereby advancing the movement of the welding robot 10. Furthermore, while the operator keeps pressing the enabling switch 52a and the robot-manipulating portion 53 with the left hand, the operator changes welding parameters by pressing buttons provided in the welding-parameter-manipulating portion 49 with the left thumb.

More specifically, to change a welding parameter, the operator presses the screen change key 47 provided in the welding-parameter-manipulating portion 49 with the left thumb while pressing the enabling switch 52a and the robot-manipulating portion 53. When the screen change key 47 is pressed, a screen for changing welding parameters appears. Then, the operator presses any of the change keys 48 with the left thumb while pressing the enabling switch 52a and the robot-manipulating portion 53, thereby increasing or decreasing the value of the welding parameter of interest, with the welding robot 10 moving.

The width of the side face of the teaching apparatus 40, i.e., the thickness of the teaching apparatus 40, is preferably 5 cm or smaller, for example. If the thickness of the teaching apparatus 40 exceeds 5 cm, it becomes difficult for the operator's fingers to reach any of the enabling switch 52a, the robot-manipulating portion 53, and the welding-parameter-manipulating portion 49 and to press the three buttons simultaneously. In contrast, if the thickness of the teaching apparatus 40 falls below 0.5 cm, it becomes difficult to hold the teaching apparatus 40. Hence, in terms of ease of holding, the thickness of the teaching apparatus 40 is preferably determined within the range of 0.5 cm to 5 cm. Furthermore, the weight of the teaching apparatus 40 is preferably 1.2 kg or less, for example. If the weight of the teaching apparatus 40 exceeds 1.2 kg, it becomes difficult for the operator to hold the teaching apparatus 40 for a long time with one hand. There is no lower limit for the weight of the teaching apparatus 40 because the lighter, the better.

The enabling switch 52a and the robot-manipulating portion 53 are preferably positioned close to each other with an interval of, for example, 5 cm or smaller. If the interval between the two buttons exceeds 5 cm, it becomes difficult for the operator to press the enabling switch 52a with any of the second, third, and fourth fingers while pressing the robot-manipulating portion 53 with the first finger.

Description of Screens Appearing on Display

Figure 8:
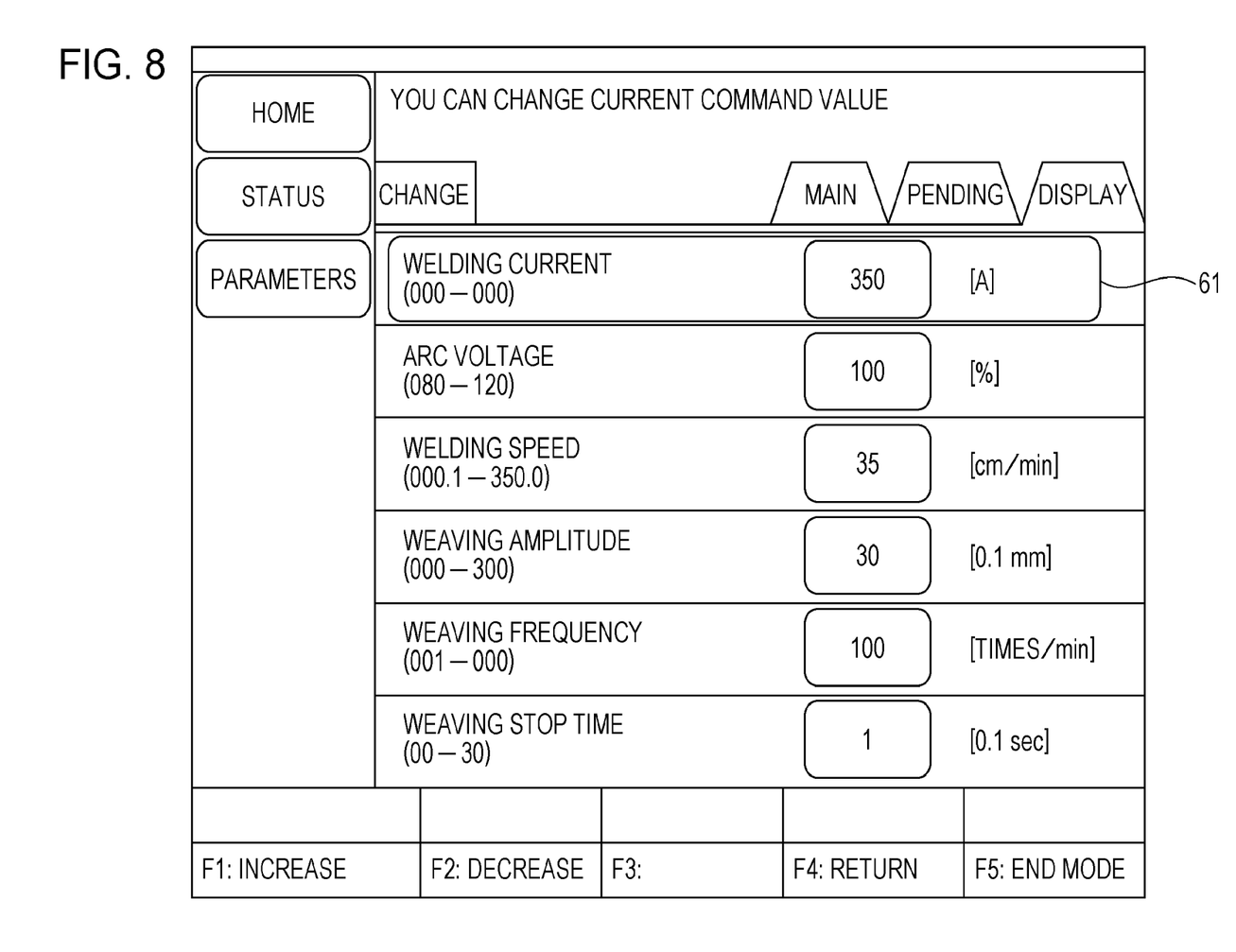
FIG. 8 illustrates an exemplary screen for changing values of welding parameters.
Figure 9:
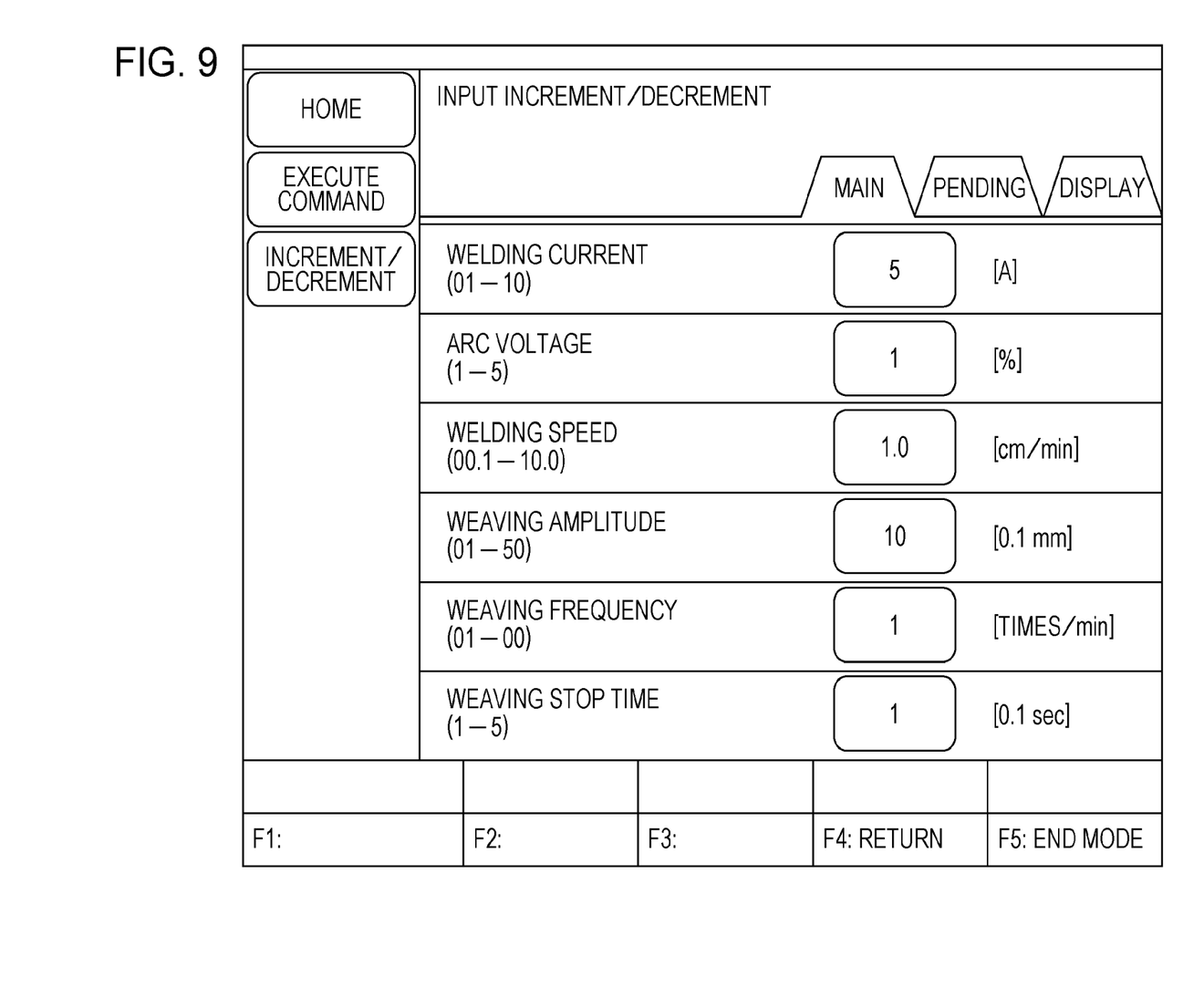
FIG. 9 illustrates an exemplary screen for setting the increment/decrement of each of the welding parameters.

Screens that appear on the display 43 of the teaching apparatus 40 during the checking operation will now be described. FIG. 8 illustrates an exemplary screen for changing values of the welding parameters. FIG. 9 illustrates an exemplary screen for setting the increment/decrement of each of the welding parameters.

For example, the screen illustrated in FIG. 8 appears after the checking operation is started and when the operator who has confirmed the generation of an arc has pressed the screen change key 47 with the thumb. This screen provides a list of the welding parameters whose values are changeable. In the exemplary screen illustrated in FIG. 8, the welding parameters include welding current, arc voltage, welding speed, weaving amplitude, weaving frequency, and weaving stop time.

The current values of the respective welding parameters are set as follows: welding current is 350 ampere (unit symbol: A), arc voltage is 100%, welding speed is 35 cm/min, weaving amplitude is 3 mm, weaving frequency is 100 times/min, and weaving stop time is 0.1 sec. Regarding the settings of welding current and arc voltage, an integrated adjustment method is employed in which, when a value is set for welding current, a value for arc voltage that corresponds to the set welding current is automatically set. The voltage that is most suitable for the set welding current is represented as 100%.

On the above screen, the operator presses the change key 48a or the change key 48b so as to select a welding parameter whose value is desired to be changed. On the screen illustrated in FIG. 8, the item "welding current" enclosed by a frame 61 is currently selected. If the operator presses the change key 48b once, the frame 61 moves down by one item to arc voltage. If the operator presses the change key 48a once with the item "arc voltage" being selected, the frame 61 moves up by one item to welding current. For example, in a state where welding current is selected, the operator changes the value of welding current by pressing the change key 48c or the change key 48d. For example, when the operator presses the change key 48c, the value of welding current increases. When the operator presses the change key 48d, the value of welding current decreases. If the operator changes any values, the welding robot 10 moves in accordance with the changed values and the checking operation continues.

The screen illustrated in FIG. 9 provides the increment/decrement by which each of the welding parameters is increased or decreased. When the operator presses the change key 48c or the change key 48d once, the value of the welding parameter increases or decreases by the increment or decrement. The increment/decrement is set for each of the welding parameters by the operator in advance, for example, prior to the checking operation. The current increments/decrements for the respective welding parameters listed on the exemplary screen illustrated in FIG. 9 are as follows: 5 A for welding current, 1% for arc voltage, 1.0 cm/min for welding speed, 1 mm for weaving amplitude, one time/min for weaving frequency, and 0.1 sec for weaving stop time.

Description of Process of Changing Welding Parameter

Figure 10:
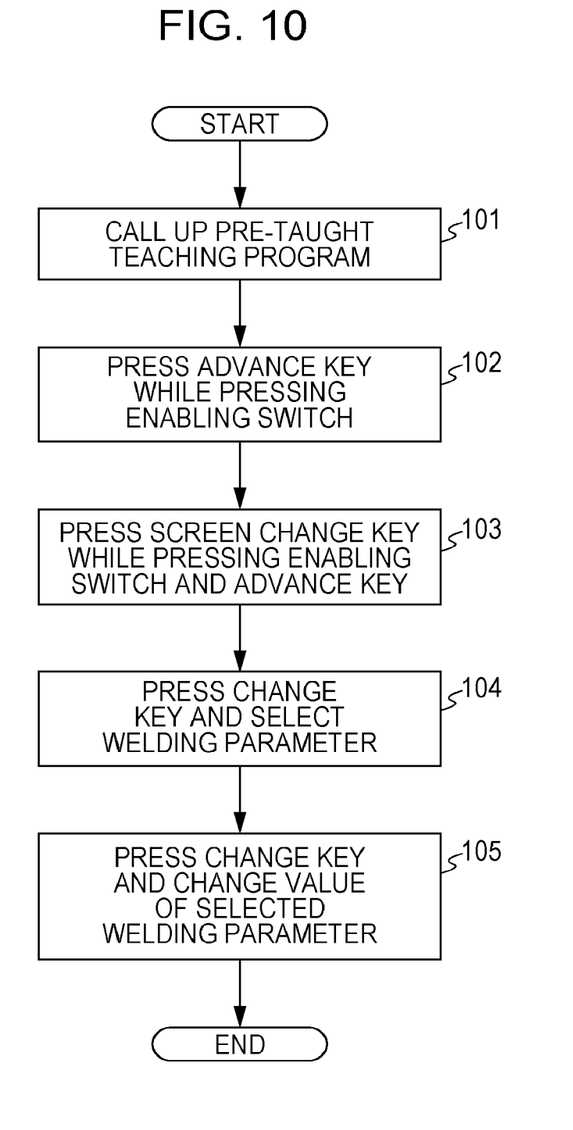
FIG. 10 is a flowchart illustrating an exemplary process of changing a welding parameter during a checking operation.

A process of changing a welding parameter during the checking operation will now be described. FIG. 10 is a flowchart illustrating an exemplary process of changing a welding parameter during the checking operation. Assume that, in the checking operation, the operator holds and operates the teaching apparatus 40 with the left hand while holding a welding protection mask with the right hand.

First, in step 101, the operator presses any button provided in the button-providing area 46 of the teaching apparatus 40 and thus calls up a teaching program that has been taught to the welding robot 10 by the teaching apparatus 40. Subsequently, in step 102, the operator holding the teaching apparatus 40 with the left hand presses the enabling switch 52a with at least any one of the left second, third, and fourth fingers and simultaneously presses the robot-manipulating portion 53 with the left first finger. If the operator keeps pressing the enabling switch 52a and the robot-manipulating portion 53, the teaching apparatus 40 sequentially advances the teaching program called up in step 101 and thus executes the program. In this step, the teaching apparatus 40 transmits the content of the program to be executed to the control apparatus 20, and the control apparatus 20 moves the welding robot 10 in accordance with the program received.

Subsequently, in step 103, after the operator has confirmed that an arc has been generated from the electrode at the welding start position that is set for the welding robot 10, the operator presses the screen change key 47 with the left thumb while keeping pressing the enabling switch 52a and the robot-manipulating portion 53. When the operator presses the screen change key 47, the screen illustrated in FIG. 8 appears on the display 43. Then, the operator changes the value of a welding parameter of interest, according to need, while observing the movement of the welding robot 10 that is executed in accordance with the teaching program.

To change a welding parameter, the operator first presses the change key 48a or the change key 48b in step 104 and thus selects a welding parameter the value of which the operator wants to change. After the operator has selected a welding parameter, the process proceeds to step 105 in which the operator presses the change key 48c or the change key 48d and thus change the value of the selected welding parameter. Then, the process ends.

As described above, in the checking operation, the operator changes the values of any welding parameters according to need while observing the movement of the welding robot 10. Subsequently, the actual welding operation is executed in accordance with the teaching program whose welding parameters have been adjusted such that an appropriate welding operation is executed.

To summarize, the teaching apparatus 40 according to the embodiment includes the enabling switch 52a and the robot-manipulating portion 53 that are provided on the back face thereof, and the welding-parameter-manipulating portion 49 that is provided on the front face thereof. These buttons are arranged such that the operator can press all of them simultaneously with one hand. Even if the operator needs to hold a welding protection mask, the operator can hold the welding protection mask with the right hand while holding the teaching apparatus 40 with the left hand. Therefore, for example, the safety problem occurring in the teaching apparatus that needs to be operated with both hands is solved.

In the teaching apparatus 40, the enabling switches 52 and the robot-manipulating portion 53 are each provided on a sloping surface. Furthermore, the width of the side face, i.e., the thickness of the teaching apparatus 40, is set such that the operator can easily hold the teaching apparatus 40, and the weight of the teaching apparatus 40 is set such that the operator can hold the teaching apparatus 40 for a long time with one hand. Such a configuration reduces the fatigue that the operator who has operated the teaching apparatus 40 for a long time suffers.

According to the embodiment, the robot-manipulating portion 53 is employed as a button for advancing the teaching program and is provided on the back face of the teaching apparatus 40. As a modification, a plurality of buttons for executing the movement of the welding robot 10, including an additional button for reversing the teaching program, may be provided on the back face of the teaching apparatus 40. Alternatively, for example, a button for switching the way of execution of the teaching program between the normal way and the reverse way may be provided within the reach of the thumb of the operator's left hand holding the teaching apparatus 40. In that case, the way of execution of the teaching program that is to be accepted by the robot-manipulating portion 53 is switchable between the normal way and the reverse way. That is, the robot-manipulating portion 53 can accept both the command for advancing the teaching program and the command for reversing the teaching program.

The embodiment concerns a case where the welding-parameter-manipulating portion 49 includes the screen change key 47 and the change keys 48. However, the present invention is not limited to such a case. For example, any buttons, other than the screen change key 47 and the change keys 48, may be included in the welding-parameter-manipulating portion 49 as long as such buttons are provided within the reach of the thumb of the operator's left hand placed under the strap 41 of the teaching apparatus 40 and are intended for changing parameters that define the movement of the welding robot 10.

The embodiment concerns a case where the plurality of change keys 48 are arranged in a crisscross pattern. However, the present invention is not limited to such a case. Nevertheless, if the change keys 48 are arranged in a crisscross pattern, the operator only needs to press the change key 48a or 48b when selecting a welding parameter of interest, or to press the change key 48c or 48d when increasing or decreasing the value of the parameter. That is, the number of buttons that the operator needs to press is small. Such a configuration contributes to easy operation of the buttons with the thumb. Alternatively, for example, ten buttons representing numbers from 0 to 9, respectively, and allowing the operator to directly input a desired value may be provided as the change keys 48 within the reach of the operator's left thumb.

The embodiment concerns a case where the strap 41 and the buttons are provided assuming that the operator holds the teaching apparatus 40 with the left hand. However, the present invention is not limited to such a case. For example, the teaching apparatus 40 may be configured assuming that the operator holds the teaching apparatus 40 with the right hand. In that case, for example, the strap 41 is provided on a portion of the right side face, in front view, of the teaching apparatus 40; the welding-parameter-manipulating portion 49 is provided on the right side, in front view, with respect to the center of the teaching apparatus 40; and the enabling switch 52a and the robot-manipulating portion 53 are provided on the left side, in rear view, with respect to the center of the teaching apparatus 40, that is, on the same side as the welding-parameter-manipulating portion 49 provided on the front face.

The embodiment concerns a case where the welding-parameter-manipulating portion 49 is provided on the front face of the teaching apparatus 40 while the enabling switches 52 and the robot-manipulating portion 53 are provided on the back face of the teaching apparatus 40. However, the present invention is not limited to such a case. The teaching apparatus 40 only needs to be configured such that the operator holding the teaching apparatus 40 with one hand can operate the welding-parameter-manipulating portion 49, the enabling switch 52, and the robot-manipulating portion 53 with that hand. That is, the teaching apparatus 40 only needs to be configured such that, in a state where the operator holding the teaching apparatus 40 with one hand is pressing the enabling switch 52, the welding-parameter-manipulating portion 49 and the robot-manipulating portion 53 are provided within the reach of at least any one of the fingers of that hand of the operator.

While an embodiment of the present invention has been described above, the technical scope of the present invention is not limited to the above embodiment. It is obvious to those skilled in the art that the present invention can be modified or embodied in various other ways without departing from the spirit and the scope thereof.

What is claimed is:

1. A teaching apparatus that is connected to a control apparatus controlling a robot and outputs a command intended for the robot to the control apparatus, the teaching apparatus comprising:
   a setting-manipulating portion provided on a first face of the teaching apparatus and accepting an operation of changing a setting that defines a movement of the robot;
   an enabling switch provided on a second face of the teaching apparatus that is opposite the first face, the enabling switch accepting an operation of changing a state of electrification of the robot; and
   a robot-movement-manipulating portion provided on the second face and accepting an operation of executing the movement of the robot,
   wherein, seen from a side of the first face, the setting-manipulating portion provided on the first face is positioned entirely on a left side or a right side with respect to a center of the teaching apparatus, and the enabling switch and the robot-movement-manipulating portion provided on the second face are positioned entirely on a same side as the setting-manipulating portion,
   wherein the teaching apparatus outputs a command intended for the robot to the control apparatus when the enabling switch and the robot-movement-manipulating portion are operated simultaneously.

2. The teaching apparatus according to claim 1,
   further comprising a strap that can maintain the hand of an operator to grip a side face of the teaching apparatus, the side face extending between the first face and the second face, wherein the side face has a width that allows an operator to hold the teaching apparatus with one hand by gripping the side face,
   wherein the enabling switch is positioned in such a manner as to be operable with the one hand that is holding the teaching apparatus while gripping the side face,
   wherein the setting-manipulating portion is positioned within a reach of a thumb of the one hand gripping the side face in a state where the enabling switch is operated with at least any one of second, third, and fourth fingers of the one hand, and
   wherein the robot-movement-manipulating portion is positioned within a reach of the first finger of the one hand gripping the side face in the state where the enabling switch is operated with at least any one of the second, third, and fourth fingers of the one hand.

3. The teaching apparatus according to claim 1, further comprising:
   a display provided on the first face,
   wherein the setting-manipulating portion includes
   a first button that accepts an operation of displaying, on the display, a screen for changing any of parameters defining a welding operation performed by the robot;
   a second button that accepts an operation of selecting one of the parameters displayed on the screen; and a third button that accepts an operation of changing a value of the selected parameter.

4. The teaching apparatus according to claim 2, further comprising:
a display provided on the first face,
wherein the setting-manipulating portion includes
a first button that accepts an operation of displaying, on the display, a screen for changing any of parameters defining a welding operation performed by the robot;
a second button that accepts an operation of selecting one of the parameters displayed on the screen; and
a third button that accepts an operation of changing a value of the selected parameter.

5. The teaching apparatus according to claim 1, wherein the enabling switch and the robot-movement-manipulating portion are each provided at a position excluding a surface of the teaching apparatus that comes into contact with a flat surface if the teaching apparatus is placed on the flat surface with the second face facing the flat surface.

6. The teaching apparatus according to claim 1, further comprising a plate-like supporting portion provided between the enabling switch and the robot-movement-manipulating portion, the supporting portion supporting a first finger of one of operator's hands that is holding the teaching apparatus.

7. The teaching apparatus according to claim 1, wherein the robot-movement-manipulating portion is positioned on a surface sloping at an angle of 5 degrees to 30 degrees with respect to a horizontal direction in a state where the teaching apparatus is placed on a flat surface with the second face facing the flat surface.

8. The teaching apparatus according to claim 1, wherein the teaching apparatus has a weight of 1.2 kg or less and a thickness of 5 cm or smaller, the thickness corresponding to a width of a side face extending between the first face and the second face.

9. The teaching apparatus according to claim 1, wherein an interval between the enabling switch and the robot-movement-manipulating portion is 5 cm or smaller.

* * * * *